United States Patent [19]

Eilersen

[11] 4,175,428

[45] Nov. 27, 1979

[54] CAPACITIVE DYNAMOMETER

[76] Inventor: Nils A. J. Eilersen, Gøngehusvej 226, DK-2950 Vedbaek, Denmark

[21] Appl. No.: 864,798

[22] Filed: Dec. 27, 1977

[30] Foreign Application Priority Data

Dec. 30, 1976 [DK] Denmark .......................... 5891/76

[51] Int. Cl.$^2$ .............................................. G01L 1/14
[52] U.S. Cl. .................................. 73/141 A; 361/283; 73/780
[58] Field of Search ............... 73/141 A, 88.5 R, 780; 361/280, 285, 290, 291

[56] References Cited

U.S. PATENT DOCUMENTS

| | | | |
|---|---|---|---|
| 3,109,984 | 11/1963 | Mehr ................................. | 361/290 X |
| 3,132,319 | 5/1964 | Brooks, Jr. ....................... | 73/88.5 R X |
| 3,141,327 | 7/1964 | Hartranft ......................... | 73/141 A |
| 3,142,981 | 8/1964 | Gross ................................. | 361/283 X |
| 3,365,689 | 1/1968 | Kutsay ............................... | 73/141 A |
| 3,471,758 | 10/1969 | Werner ............................. | 361/280 |
| 3,602,866 | 8/1971 | Saxl ................................... | 361/283 X |

Primary Examiner—Charles A. Ruehl
Attorney, Agent, or Firm—Watson, Cole, Grindle & Watson

[57] ABSTRACT

A capacitive dynamometer comprises an elastic body with a measuring cavity which is deformed in different directions when a mechanical force to be measured is applied to the elastic body. Deformation of the inner wall of the cavity in different directions are picked up in the form of changes of capacity in opposite senses by means of capacitor electrodes co-operating with the inner wall. By applying these changes of capacity to a differential capacity measuring device, a signal may be obtained which is representative of the force to be measured and is not influenced by changes of temperature, because these will change the capacity values of all electrodes in the same sense.

10 Claims, 16 Drawing Figures

CAPACITIVE DYNAMOMETER

BACKGROUND OF THE INVENTION

The invention relates to a capacitive dynamometer, i.e. a device for measuring a mechanical force by means of capacitive electrodes.

From the German published patent application No. 1,909,979 a capacitive dynamometer is known comprising an elastic body having a cavity in which two capacitive electrode sets are so arranged that the capacity value of one set is increased and the capacity value of the other set is decreased under the influence of deformation of the elastic body in the direction of the force to be measured. In this known apparatus temperature compensation is possible only to a very limited extent, and in the case of appreciable changes of temperature measuring errors are therefore unavoidable and can be kept at an acceptable level only by using special and expensive materials having a very low coefficient of thermal expansion.

SUMMARY OF THE INVENTION

According to the invention, a capacitive dynamometer comprises an elastic body for receiving a mechanical force to be measured, said body having a measuring cavity so shaped and located in said body that under the influence of the force to be measured the configuration of its inner wall is deformed in different directions, sets of capacitor electrodes being arranged in said measuring cavity in such a manner that their capacity values depend on dimensional changes of said inner wall in different directions.

Thus, use is made of the well known fact that when a mechanical force is applied to an elastic body, mechanical stresses are produced in different directions, and when a cavity is suitably located in the body, the configuration of its inner wall is therefore correspondingly deformed. As an example, when a compressional force is applied to a body, this will be compressed in the direction of the force and will expand in all directions perpendicularly thereto, and if a cylindrical cavity is so located in the body that the force acts along one diameter thereof, the inner wall of the cavity will contract along that diameter and expand along a diameter perpendicular thereto. In the case of a tensional force, the picture is reversed. As another example, if a loading force is applied to a cantilever beam, compressional stresses will be produced over part of the section of the beam, and tensile stresses over another part of the section, and besides shearing stresses will be produced both longitudinally and transversely of the beam. Also in this case a cylindrical cavity through the beam will be deformed so as to contract in one direction and to expand in another direction, but these directions will not be parallel to and perpendicular to the direction of the force respectively, but rather displaced approximately 45° therefrom and may not even be exactly perpendicular to one another.

Cavities of shapes other than cylindrical will similarly contract and expand in different directions. E.g. a spherical cavity which is subjected to a compressional force along one diameter thereof, will contract in the direction of that diameter and expand in all directions perpendicular thereto.

If now sets of capacitor electrodes are so arranged that their capacity value is influenced by the said expansions and contractions, the difference of their capacity values will be representative of the mechanical force which caused them. On the other hand, dimensional changes of the configuration of the inner wall of the cavity resulting from changes of temperature will be proportional in all directions and will therefore not give any contribution to the said difference of capacity values.

It is therefore an advantage of the invention that by determining the difference of the capacity values, or more generally, where several sets of capacitor electrodes are used, the numeric integral of the capacity values, by means of well known electronic circuitry, a measurement of a mechanical force can be obtained, which is not subject to errors resulting from changes of temperature.

Another advantage of the invention is that the measurement depends on deformations of large parts of the elastic body, so that inaccuracies in the making of the elastic body are levelled out and central application of the force to the elastic body is not critical.

The simplest way of arranging the sets of electrodes so as to make their capacity values depend on the configuration of the inner wall of the cavity as described is to use the inner wall of the cavity as an electrode common to all sets, and to mount a number of counter electrodes of limited area in the required positions on an electrode carrier provided in the cavity. However, the reverse arrangement is also possible, viz. using electrode sets formed by the electrically conductive outer surface of a core member mounted in the measuring cavity in combination with electrodes of limited area mounted on the inner wall of the cavity. Moreover, it would of course be possible to mount discrete electrodes both on the inner wall of the cavity and on a core member provided therein.

DESCRIPTION OF THE PREFERRED EMBODIMENTS

Figure 1:
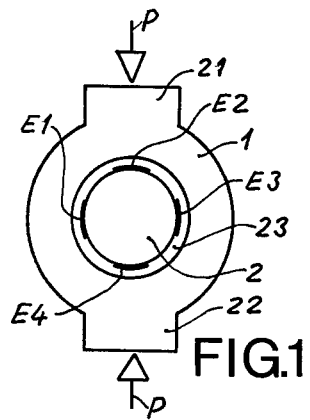
FIG. 1 is a diagrammatic end view of one form of a dynamometer according to the invention, where the elastic body is in the form of a ring.
Figure 3:
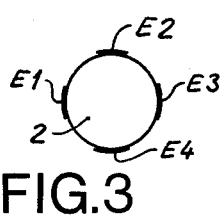
FIG. 3 is a separate end view of the electrode carrier of the dynamometer of FIG. 1.
Figure 4:
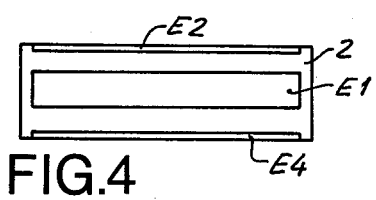
FIG. 4 is a side view of the electrode carrier of FIG. 3.

FIG. 1 shows a substantially cylindrical ring 1 provided with neck portions 21 and 22 for the application of a force P to be measured. The ring 1 which serves as the elastic body of a dynamometer according to the invention may e.g. consist of hardened spring steel. The cylindrical hole 23 of the ring forms a measuring cavity in which an electrode carrier 2 with electrodes E1, E2, E3 and E4 is mounted. The electrode carrier, which is shown in end view in FIG. 3 and in side view in FIG. 4, can e.g. consist of a ceramic tube, and the electrodes may be metal strips glued to the surface of the ceramic tube or metal films deposited on the surface of the ceramic tube. The electrodes E1 and E3, which are located in opposed zones of maximum expansion of the measuring cavity 23 under the influence of the force to be measured, are interconnected and the same applies to the electrodes E2 and E4, which are located in opposed zones of maximum contraction. The two pairs of electrodes are insulated from one another.

When the ring is compressed by the force P, the measuring cavity assumes an oval shape to produce maximum expansion and contraction in the areas of the electrodes. The distance between the inner wall of the measuring cavity 23 and the electrodes E2-E4 is decreased, while the distance between the inner wall of the measuring cavity and the electrodes E1-E3 will be increased. Each electrode forms together with the inner wall of the measuring cavity 23 a capacitor, the value C of which is determined by the area A of the electrode and the distance a to the inner wall of the measuring cavity 23 as follows:

$$C = A/a \, K,$$

where k is a constant.

Consequently, under the influence of the force P the capacity of the electrodes E2-E4 is increased, while the capacity of the electrodes E1-E3 will be decreased.

In the case of a change of temperature the measuring cavity 23 will maintain its geometrical shape and will only change its dimensions proportionally in all directions. It will therefore be seen that under the influence of a change of temperature the capacity values of E2-E4 and E1-E3 will be changed equally and in the same direction.

If E2-E4 and E1-E3 are connected to a device measuring differences of capacity, the changes of capacity resulting from the deformations caused by the force P will give a measuring signal, while the capacity changes as a consequence of temperature changes will not give any error signal.

The length of the electrode carrier 2 and the thickness of the ring 1 are mutually adjusted and chosen in accordance with the range of forces to be measured. Optimum accuracy is obtained, if the expansion of the measuring cavity 23 perpendicularly to the direction of the force is equal to the contraction of the measuring cavity in the direction of the force. This can be obtained by weakening the ring 1 in the zones of the electrodes E1, E3, e.g. by somewhat flattening the outer configuration of the ring or by boring holes through the ring in suitable positions. However, this equalisation of maximum contraction and maximum expansion is not critical.

On principle, the electrodes E1, E4 or E2, E3 could be omitted. However, by the symmetrical arrangement of electrodes illustrated the centering of the electrode carrier 2 in the measuring cavity 23 becomes less critical, because a decrease of the distance e.g. between E1 and the inner wall of the cavity will be accompanied by a corresponding increase of the distance between E3 and the inner wall, and since E1 and E3 are connected with each other, the total capacity of E1-E3 will be approximately constant in the case of small deviations from accurate centering of the electrode carrier.

Figure 2:
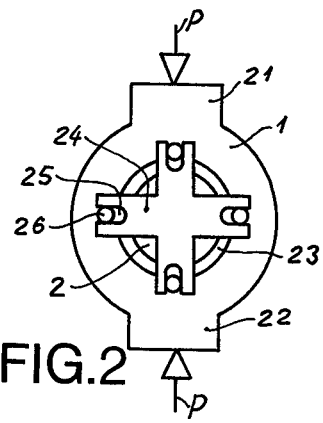
FIG. 2 is the dynamometer of FIG. 1 with addition of a holding member for the electrode carrier.

FIG. 2 shows an example of a holding member for mounting the electrode carrier 2 centrally in the measuring cavity 23 irrespective of deformations of the elastic body. Such a holding member is provided at each end of the ring and comprises four arms 24 to which the electrode carrier 2 is attached and which are constructed with longitudinal slots 25 engaged by pins 26 projecting from the end surface of the ring 1.

An alternative way of mounting the electrode carrier 2 in the measuring cavity 23 is to provide relatively soft, elastic packing rings, e.g. O-rings, around the electrode carrier 2 for engagement in grooves in the inner wall of the measuring cavity 23. These rings will hold the electrode carrier in the cavity by friction, and since they can easily be compressed and expanded they will maintain the electrode carrier in a central position also when the cavity is deformed.

Figure 5:
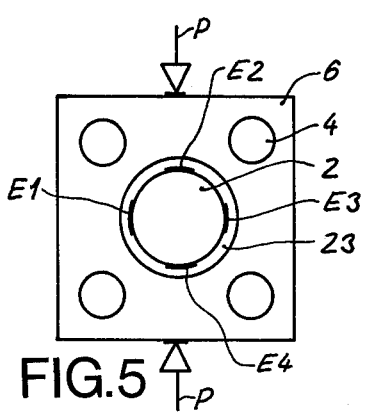
FIG. 5 is an end view of a dynamometer according to the invention, where the elastic body is in the form of a rectangular block.

In the embodiment of FIG. 5, the elastic body consists of a rectangular block 6 with a cylindrical measuring cavity 23 corresponding to that of FIG. 1. Moreover, the block 6 is provided with one or more rows of holes 4 which are so located that the deformation of the measuring cavity 23 under the influence of the force P will correspond to the deformation of the measuring cavity 23 in FIG. 1. By variation of the diameter and the number of the holes 4, the deformation of the block 6 can be controlled in simple manner. The dynamometer of FIG. 5 is very cheap and simple to manufacture, because only simple working processes are to be used as compared with the embodiment of FIG. 1, which requires forging or contour milling. Moreover, the dynamometer of FIG. 5 is considerably more stable towards lateral forces than that of FIG. 1.

If the block 6 is provided with hooks or the like for engagement of the force P, the dynamometer according to the invention may also be used for measuring pulling forces.

If the wall between the holes 4 and the measuring cavity 23 becomes too thin, great stresses may be produced in the material, and it may therefore be advantageous to break away the wall at such places.

Figure 6:
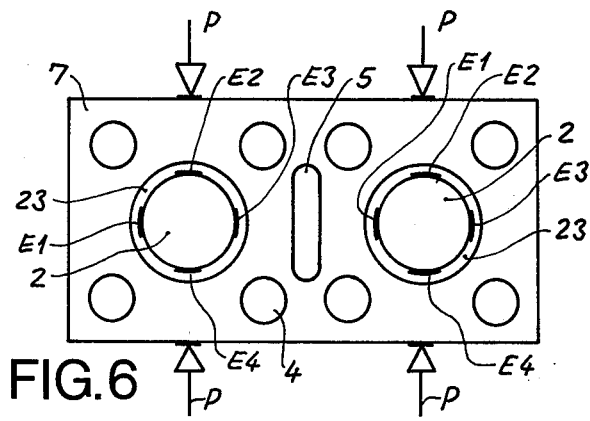
FIG. 6 is a dynamometer similar to that of FIG. 5, but with two measuring cavities.

In the case of very considerable lateral forces it will be advantageous to construct the dynamometer as illustrated in FIG. 6. In this embodiment a rectangular block 7 is constructed with two measuring cavities 23 with electrode carriers 2 and electrodes E1-E4 and with two rows of holes 4 for controlling the deformations. To permit deformations in the material between the two measuring cavities, the block is provided with an elongated hole 5. If the two halves of the block 7 are approximately identical, the dynamometer of FIG. 6 can take up great lateral forces and torques without measuring error. Where, as in FIG. 6, more than one measuring cavity is used, all electrodes having the same denomination are connected in parallel.

Figure 7:
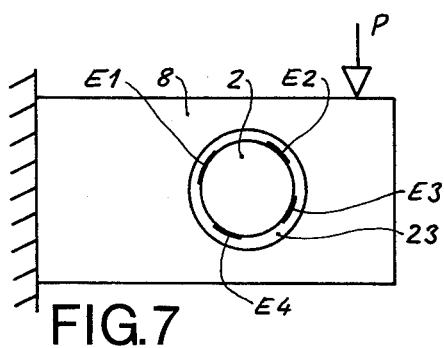
FIG. 7 is a side view of a dynamometer according to the invention, where the elastic body is in the form of a cantilever, this being in its non-loaded state.
Figure 8:
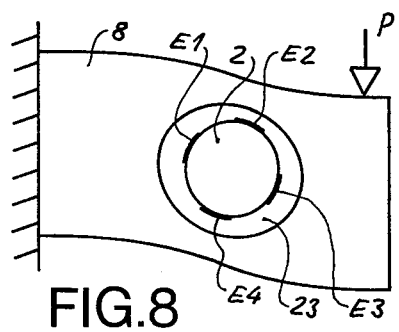
FIG. 8 is the dynamometer of FIG. 7, in which the deformation of the cantilever and the measuring cavity therein is illustrated in an exaggerated manner.

FIG. 7 shows a dynamometer according to the invention in the form of a cantilever beam 8, to which the force P is applied at its free end. At a suitable location between the ends a hole is bored transversely through the beam 8 to form a measuring cavity 23, in which the electrode carrier 2 is mounted. FIG. 8 shows in an exaggerated manner the deformations of the beam and the measuring cavity. It will be seen that also in this case the hole assumes in oval shape under the influence of the force P, but the directions of maximum contraction and maximum expansion will in this case not be parallel and perpendicular to the direction of the force P respectively, but will be inclined relative to that direction so that the electrodes E1-E4 have to be mounted in accordance with the tilted oval shape of the measuring cavity 23.

Figure 10:
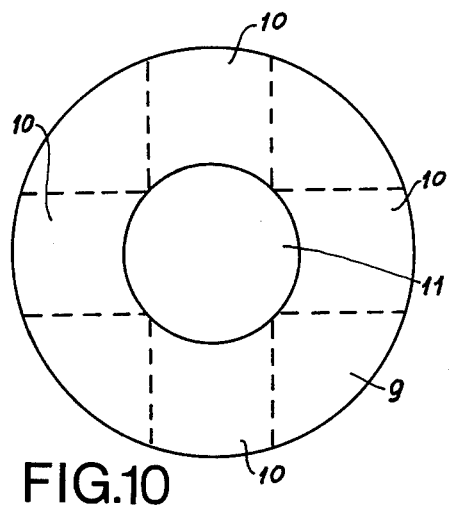
FIG. 10 is a top view of the dynamometer of FIG. 9.
Figure 9:
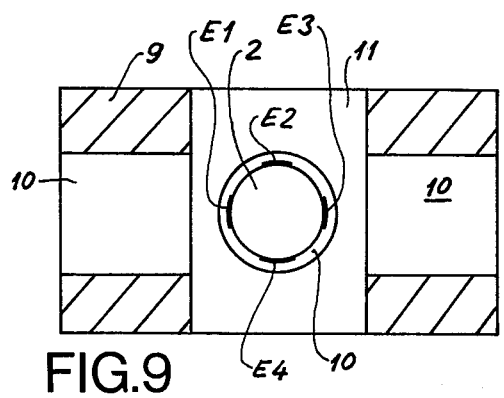
FIG. 9 is a cross section through a disc-shaped dynamometer according to the invention.

FIGS. 9 and 10 show a dynamometer according to the invention, in which the elastic body is constructed in the form of a disc 9 constructed with four radial bores 10 serving as measuring cavities for the mounting of electrode carriers 2. The number of bores 10 can also be chosen greater or less. The force P is distributed relatively uniformly over the whole surface of the disc, whereby all bores 10 assume an oval configuration. If the electrode sets of the individual electrode carriers 2 are connected in parallel to a capacity measuring device, a measurement value is obtained which is proportional to the force on the whole of the disc 9. The disc 9 is constructed with a central hole 11, whereby this dynamometer can be mounted as a washer plate to measure bolt tensions and the like. In this embodiment, like in all others, additional holes may be bored to control the deformation under the influence of the force.

In all the dynamometers so far described the measuring cavity is shown as having a cylindrical cross section in the non-loaded state.

Figure 11:
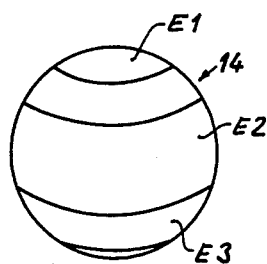
FIG. 11 is a spherical electrode carrier in perspective view.

FIG. 11 shows an electrode carrier in the form of a spherical member 14 provided with electrically conductive capacitor electrode films E1 and E3 in opposed polar areas and E2 along a belt around the spherical member. If the electrode carrier 14 is mounted in a spherical measuring cavity which is so deformed by the force to be measured that the capacities E1 and E3 increase, the capacity of E2 will at the same time decrease owing to the expansion of the spherical measuring cavity in all directions perpendicular to the force. If E1 and E3 are connected in parallel to one side and E2 to the other side of a differential capacity measuring device, a signal representative of the force to be measured will be obtained.

Figure 12:
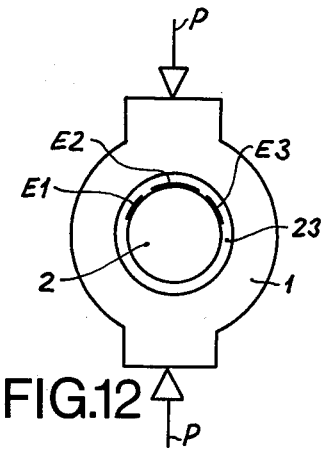
FIG. 12 is the measuring cavity and electrodes of a dynamometer according to the invention, in which one electrode set is provided in a zone of maximum contraction and two additional electrodes are provided in neutral zones.

In FIG. 12 an electrode holder 2 carrying only three electrodes E1, E2 and E3 is mounted in a cylindrical measuring cavity 23. The electrode E2 is located in a zone of maximum contraction of the measuring cavity, while the electrodes E1 and E3 are mounted in neutral zones and have half the size of the electrode E2. The neutral zones will be located at about 45° from the zone of maximum contraction. If E1 and E3 are connected in parallel to one side and E2 to the other side of a differential capacity measuring device a signal is obtained which is representative of the force to be measured, only E2 serving as an active electrode, while E1 and E3 are passive reference electrodes serving the purpose of temperature compensation.

Figure 13:
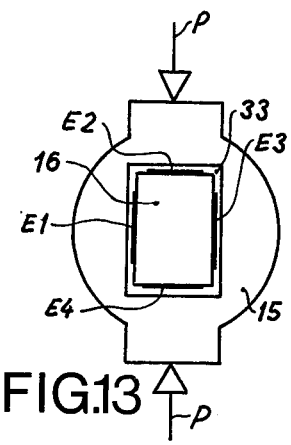
FIG. 13 is a dynamometer according to the invention having a measuring cavity of rectangular cross section.

FIG. 13 shows an elastic body 15 with a rectangular measuring cavity 33 and a rectangular electrode carrier 16 with the electrodes E1, E2, E3 and E4. The function is the same as that of the dynamometer of FIG. 1, but by varying the ratio of the sides of the rectangle and the electrode areas as well as the distances of the electrodes E1-E4 from the inner wall of the cavity 33, special stress-to-force functions can be obtained.

Figure 14:
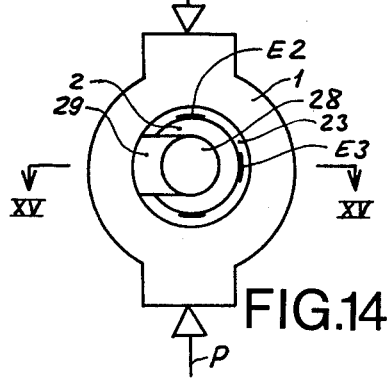
FIG. 14 is an end view of a dynamometer corresponding to that of FIG. 1, but with a holder for the electrode carrier different from that in FIG. 2.
Figure 15:
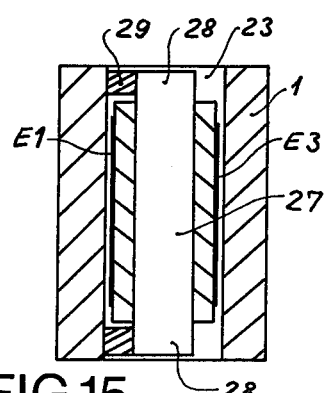
FIG. 15 a longitudinal section through the dynamometer of FIG. 14.

FIGS. 14 and 15 show a dynamometer similar to that of FIG. 1, but constructed with a holding member for the electrode carrier different from that illustrated in FIG. 2.

In FIGS. 14 and 15 the electrode carrier 2 is mounted on a bolt 27 having extending ends 28 which are attached, e.g. by an adhesive, to brackets 29, which are again attached, e.g. likewise by an adhesive, to the inner wall of the measuring cavity in the angular zone of the electrode E1. The capacitors formed by the electrodes E2 and E4 are influenced by the force in the same manner as previously described, the capacitor formed by the electrode E1 is not influenced by the force, but the capacitor formed by the electrode E3 is changed approximately twice as much as in the embodiment of FIGS. 1 and 2. All four capacitors are proportionally changed by variations of temperature, so when the capacitors are connected to a differential capacity measuring device in the same manner as in the embodiment of FIG. 1, the net result will be approximately the same as in FIG. 1, i.e. the capacity value determined by the differential capacity measuring device will be representative of the force without an error arising from temperature changes.

Figure 16:
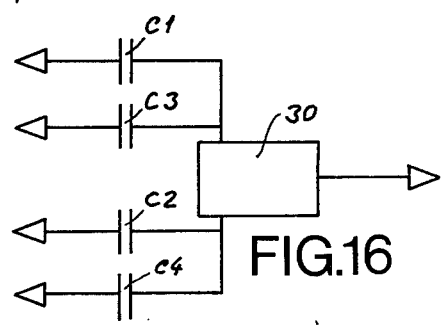
FIG. 16 is a diagram showing the connection of the capacitors formed by electrode sets of a dynamometer according to the invention to a capacity measuring device.

FIG. 16 shows diagrammatically the connection of the capacitors C1, C3, C2, C4 to a differential capacity measuring device 30, e.g. of the type disclosed in the U.S. Pat. No. 3,646,433. Using the terminology of that patent, the capacitors C1 and C3 are connected in parallel as main capacitor of the measuring circuit, while the capacitors C2 and C4 are connected in parallel as the reference capacitor of the measuring circuit. The measuring circuit will determine the capacity difference between the main capacitor and the reference capacitor in the form of a DC-voltage U, which in the present case can be expressed by the equation $$U = k[(c1+C3)-(C2+C4)].$$

Final adjustments for O-value in the non-loaded state of the dynamometer, for proportionality of measurement and for any residual influence of temperature can be performed by well known electronic circuitry means.

I claim:

1. A capacitive dynamometer comprising an elastic body for receiving a mechanical force to be measured, said body having a measuring cavity so shaped and located in said body that under the influence of the force to be measured the configuration of its inner wall is differently deformed along different axes, an electrode carrier forming a separate structural member being mounted in said measuring cavity, sets of capacitor electrodes, each including opposed electrode areas carried by said inner wall and said electrode carrier respectively, said sets of capacitor electrodes being so located in different positions along said inner wall that their capacity values depend on dimensional changes of said inner wall along different axes.

2. A dynamometer as in claim 1, in which each electrode set is formed by the electrically conductive inner wall of the measuring cavity in combination with an electrode of limited area mounted on said electrode carrier.

3. A dynamometer as in claim 1, in which one electrode set is arranged in a zone of maximum contraction of the inner wall of the measuring cavity under the influence of the force to be measured, and another electrode set is arranged in a zone of maximum expansion of the inner wall of said cavity under the influence of the force to be measured.

4. A dynamometer as in claim 3, in which an additional electrode set is arranged in each of the zones of maximum contraction and expansion of said inner wall opposite to those mentioned in claim 4.

5. A dynamometer as in claim 1, in which said elastic body is formed as a cylindrical ring.

6. A dynamometer as in claim 1, in which said elastic body is formed by a rectangular block and said cavity is formed by a hole through said block in one of its dimensional directions.

7. A dynamometer as in claim 6, in which at least one additional similar measuring cavity with electrode carrier and sets of electrodes is provided in said block.

8. A dynamometer as in claim 1, in which said elastic body consists of a cantilever beam adapted to be loaded by the force to be measured at its free end, and being constructed, in a zone between its ends, with a transverse hole forming the measuring cavity.

9. A dynamometer as in claim 1, in which said measuring cavity is formed by a disc having a plurality of radial bores forming measuring cavities.

10. A dynamometer as in claim 1, in which said elastic body, in addition to said measuring cavity, is provided with additional cavities for adjustment of the deformation of the body under the influence of the force to be measured.

* * * * *